Patented July 18, 1944

2,354,109

UNITED STATES PATENT OFFICE 2,354,109

METHOD OF FORMING SELENIUM COATINGS

Edward Alison Flood, Rockcliffe Park, Ontario, Canada, assignor to The Honorary Advisory Council for Scientific and Industrial Research, Ottawa, Ontario, Canada, a corporation of the Dominion of Canada No Drawing. Application December 24, 1941, Serial No. 424,332

5 Claims. (Cl. 117—22)

This invention relates to selenium coatings and to a method of producing such coatings in the form of a thin continuous film firmly adhering to or united with the solid surface to which it is applied.

The selenium coatings may be applied to surfaces of metal, glass and like material for protection purposes.

Various methods of coating objects with metals are known. A blast of fluid containing the coating metal in vapour form has been projected on to the surface to be coated. A flame in which the coating metal is melted, and if necessary reduced, has been projected on to the surface of the object to be coated. Selenium coatings have been formed by the use of bath dips or sprays with or without electrolytic circuits. It has been found however that these heretofore known methods do not produce highly effective selenium coatings.

An object of the present invention is to provide a coating in the form of a continuous film of vitreous selenium, free from granular structure, which closely adheres or bonds to the surface to which it is applied. A further object is to provide a method in which the selenium is cracked or dissociated into free radicals or molecular fragments, which are particularly reactive, and which, upon contacting a solid body to be coated, combine to form a unitary vitreous film in combination with the material of the body, or firmly adhering thereto by adsorption. A further object is to provide a convenient method for applying selenium in this form to metal or other objects to be coated.

In accordance with the invention the surface of the object to be coated is exposed to a concentration of free radicals or molecular fragments of selenium. These radicals or fragments are much more reactive than particles or droplets of selenium and as they impinge on the solid surface they effectively combine together and coalesce or weld into a continuous vitreous film. In the case of metal surfaces it appears that during the formation of the film there may be an actual combination of the selenium fragments or radicals with the metal to produce great adherence. In any case the film adheres strongly to the surface to which it is applied by adsorption or by adsorption and combination together. The continuous film shows no transverse structure under the microscope. Even under high magnification it should be substantially free from dark rod-like structures. This is an important feature of effective selenium coatings. If the selenium is not cracked or dissociated into these reactive radicals or fragments the film formed will consist of selenium in loosely bonded metallic form. Such films are not effective in resisting corrosion and the like.

The film coating should not be thicker than 0.130 mm., and for best results in resisting corrosion in magnesium or its alloys it should have a thickness between 0.0025 and 0.0050 mm. On a substantially smooth surface the adherent coating is a bright shiny red colour which distinguishes the coating from the dull and darker colour of previous selenium coatings.

The coatings may also be used in bonding rubber, paint films, oil and the like to metal or other objects. They may be applied to objects where substantially close tolerances are required. They facilitate the application of rubber coatings or cushions to metals to which it is normally difficult to cause rubber to adhere. They serve as an under coat for protective paint finishes on metals which corrode easily. For high pressure lubrication the coating may be applied to the bearings and the like.

The method may be carried out by adding diethyl selenium to gasolene and burning the selenium containing gasolene in a plumber's blow-torch. Hydrogen selenide may be introduced into the gas stream of an air-gas standard torch, such as a "Buffalo Dental" torch. Hot selenium vapour may be introduced into the combustible gas stream of an air-gas torch. In each case the flame contains a cracking zone in which the selenium is dissociated into the desired reactive radicals or fragments and as the surface to be coated is maintained within this zone the vitreous film forms. The time of exposure to the flame will depend upon the size of the article to be coated and the size of the flame. The temperature of the object to be coated is maintained below 400° C. It is essential that the selenium in its dissociated reactive form, as it appears in the cracking zone, be caused to impinge on the surface to be coated before the radicals or fragments combine or loose their active form. Otherwise the continuous vitreous film will not form and the selenium will appear in either a nonadherent vitreous form or more often in the usual metallic form in a pulverant coating of irregular structure and dull dark colour. The selenium cracking zone is located beyond the normally blue part of the gas flame and inside the normally yellowish part of the flame.

A little experience readily enables even an unskilled operator to apply the method and to play the cracking zone of the flame on the object to be coated. If the object to be coated is in other than the cracking zone of the flame the undesirable dull and darker or non-adherent coating appears on the object. The thickness of the continuous film may be varied as desired by regulating the time of applying the flame.

In coating thick sections they should be heated before applying the coating flame to avoid excessive cooling of the disassociated selenium and condensation of selenium vapour and moisture before the reactive selenium radicals or fragments have combined to constitute the film. In the case of thin sections which may be heated as high as 400° C. by application of the flame cooling may be provided.

While the invention has been described with reference to coating with selenium it is also applicable to coating with a mixture of selenium and sulphur.

I claim:

1. A method of forming continuous vitreous coatings of selenium on solid surfaces which comprises disassociating selenium in a flame of a combustible mixture to form reactive radicals and fragments and playing the cracking zone of the flame on the solid surface to be coated.

2. In the coating of metal and other surfaces with selenium the method which comprises introducing selenium material into a fluid fuel, burning the fuel to form a flame, disassociating selenium in the flame to form reactive selenium fragments and causing the cracking zone of the flame to impinge on the surface to be coated to form an adherent continuous vitreous film thereon.

3. In the coating of metal and other surfaces with selenium the method which comprises causing the cracking zone of a flame containing selenium to impinge on the surface to be coated.

4. A method of forming a continuous vitreous coating of selenium on metal surfaces which comprises introducing selenium material into a combustible gas, burning the gas in a flame at a temperature to dissociate selenium and causing the flame containing the selenium in dissociated form to impinge on the surface to be coated.

5. A method of coating metals with selenium as defined in claim 3 wherein the said flame is maintained at a temperature to dissociate all of the selenium to insure a bright reddish coating free from granular structure.

EDWARD ALISON FLOOD.